INVENTORS
MICHAEL J. PRYOR
WILLIAM H. ANTHONY

ATTORNEY 3,676,113
ALUMINUM-ZINC-BORON ALLOYS
Michael J. Pryor and William H. Anthony, Hamden, Conn., assignors to Olin Mathieson Chemical Corporation
Original application Oct. 25, 1967, Ser. No. 677,955, now Patent No. 3,579,313, dated May 18, 1971. Divided and this application Oct. 29, 1967, Ser. No. 870,972
Int. Cl. C22c 21/00
U.S. Cl. 75—146                8 Claims

ABSTRACT OF THE DISCLOSURE

This invention relates to a novel high strength Al-Zn-B alloy metallurgically bonded to steel and heat treating processes therefore, for use in both aerial and underground cable sheathing.

---

This application is a division of copending application Ser. No. 677,955, now U.S. Pat. No. 3,579,313, filed Oct. 25, 1967.

Most underground cable sheathing now is made from either annealed Alloy 110 (99.9% pure Cu) or Alloy 220 (Copper Development Designation). The use of Alloy 110 predominates particularly in the medium and larger size cables.

Aerial cables are very often sheathed with annealed 1100 aluminum (Aluminum Association Designation).

The cable sheaths must provide adequate mechanical strength, suitable electrical conductivity and, for underground applications, high corrosion resistance.

There is an additional problem on underground cable sheathing with respect to rodent attack, particularly by gophers. For this reason, the gage of copper cable sheathing used west of the Mississippi is 0.010", whereas, that used east of the Mississippi (where gophers are comparatively absent) is only 0.005".

Furthermore, the present scarcity and unstable price of copper has resulted in a search for other metallic systems which would be suitable for cable sheathing.

As an interim solution, stainless steel clad with copper has been investigated. However, its corrosion resistance at voids created in service in the exterior copper coating is too poor to warrant serious consideration. Evidently, copper is cathodic to stainless steels in many soils and promotes rapid perforation.

Three layer composites have also been proposed in U.S. Pat. 3,272,911. However, these composites suffer from the disadvantage of having poor corrosion resistance in soils. Furthermore, a three layered composite requires an additional cost outlay for material compared to a two layer composite.

A desirable cable sheathing should contain no copper alloy, should have acceptable electrical conductivity, should be mechanically strong enough to prevent rodent or animal attacks such as gophers, should be as corrosion resistant as possible, and should preferably have only two layers.

To date, a solution has not been obtained to this problem.

It is an object of this invention to provide a composite cable sheath which has high electrical conductivity.

It is another object of this invention to provide a composite cable sheath with sufficient strength to withstand animal attacks such as by gophers.

It is another object of this invention to provide a composite cable sheath which is corrosion resistant to moist soil.

It is another object of this invention to provide a composite cable sheath which is easy to bond.

It is another object of this invention to provide a composite cable sheath which utilizes only two layers.

Other objects will be apparent from the following disclosure.

In the drawings, FIG. 1 is a sectional view of a typical cable sheath.

Figure 1:
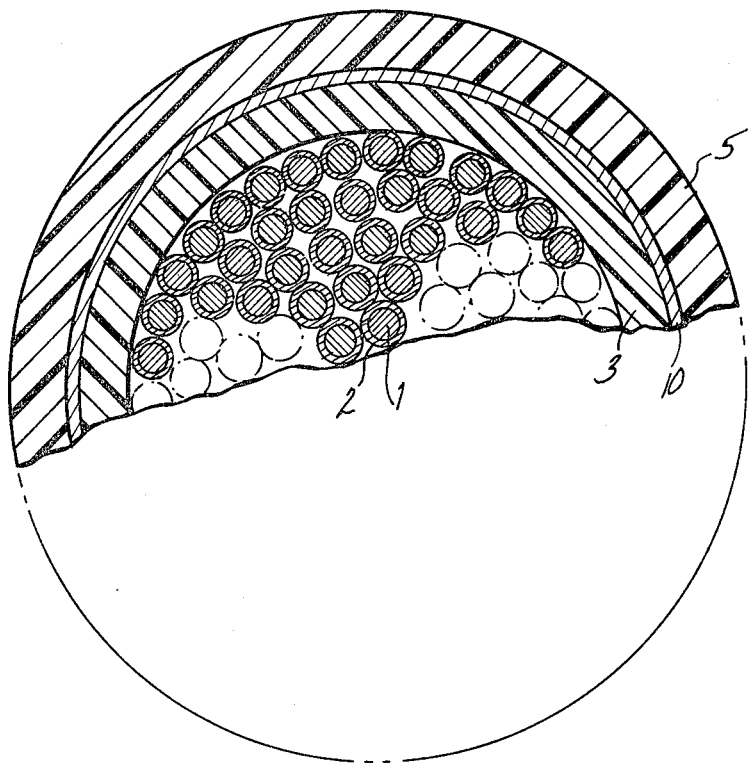

Cables in general are constructed as follows:

In FIG. 1, the conducting cables 1 are provided with insulation 2. A plurality of such insulated cables are provided within an inner jacket of insulation 3. The metallic sheath is shown generally at 10; its construction will be described in detail hereinafter. Finally, an external layer of insulation 5, also preferably made of a polymeric material, such as polyethylene, may be provided on the outside of the cable sheath.

According to the present invention, it has been found that a composite cable sheath made of an aluminum alloy as the outer cladding, metallurgically bonded to a steel core is a satisfactory solution to the previously mentioned cable sheath problems.

Figure 2:
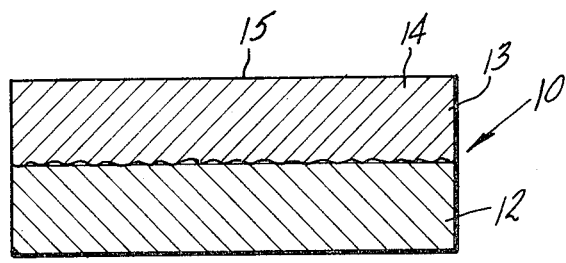
FIG. 2 is an enlarged partial sectional view of the cable sheath of the present invention.

Thus, for example, the cable sheath 10, as shown in the enlarged view, FIG. 2, comprises an aluminum Alloy 14 metallurgically bonded at 13 to steel core 12. If desired, the surface 15 may be corrugated (not shown) if an external insulation layer 5 in FIG. 1 is utilized.

According to the present invention, it has been found that composites of aluminous alloys containing 0.2% to 2.0% zinc, 0.001% to 0.2% boron, and at least one hardening element metallurgically bonded to steel, provides the necessary sacrificial corrosion resistance, electrical conductivity, and mechanical strength to withstand animal attacks. The aluminum alloy must have an electrical conductivity of at least 50% of the International Annealed Copper Standard. The boron content insures that the 50% level will be obtained. The zinc insures the necessary galvanic protection with respect to steel. In addition to the zinc and boron, there must be at least one additional element present to provide strength for the aluminum component.

The preferred zinc content to insure galvanic protection of steel is from 0.5% to 1.5% zinc. The preferred boron content is from 0.004% to 0.1%.

Thus, according to one embodiment of the present invention, the aluminum component must contain from 0.2% to 2.0% Zn from 0.001% to 0.2% boron for electrical conductivity and from 0.05% to 0.4% iron to provide strength. The silicon content must be no more than 0.2%. The remaining impurities limitations are .05% each, total 0.15%. The preferred zinc content is 0.5% to 1.5% and the preferred boron is 0.02% to 0.2%.

According to another embodiment of the present invention, the aluminum component must contain from 0.2% to 2.0% Zn, from 0.001% to 0.2% boron, together with up to 0.4% copper, 0.3% to 1.4% magnesium, 0.4% to 1.2% silicon, up to 0.2% manganese, up to 0.1% chromium, other impurities up to 0.05% each, total of such other impurities, 0.15% maximum.

Preferably, the zinc content is 0.5% to 1.5% and the boron content of from 0.004% to 0.1%. Also, preferably, the silicon content is from 0.5% to 0.9%, and the magnesium content is from 0.5% to 0.9%.

In the foregoing composites, mild steel having a carbon content as low as 0.01% may be used. There must be enough carbon in the steel so that a strength of at least 25,000 p.s.i. yield strength is provided. Steels having carbon contents higher than mild steel can also be used, provided they show in excess of 10% elongation in the condition used. The steel provides the strength for the composite so that it can effectively resist animal and rodent attack. If desired, of course, conventional alloying elements for steel such as chromium, manganese, nickel, cobalt in proportions commonly used in alloy steels may be used. However, from a standpoint of economics, it is usually less expensive to employ straight carbon steels. For some applications, if it is desired to provide even greater corrosion resistance insurance, conventional stainless steel of the 300 and 400 series and known modifications thereof to be used. If this is done, the 300 series is preferred as, in general, the 300 series is less brittle than the 400 series. However, as mentioned previously, in general ordinary carbon steel can easily provide the needed composite strength.

The aluminum component must be present in an amount of at least 50% of the thickness of the composite. A preferred thickness ratio of aluminum to steel is 7 to 3.

The bonding process used to bond the aluminum component to the steel core is not critical so long as a sound metallurgical bond, free from intermetallics, is obtained. For example, the bond can be formed according to the Rader, Goldman, Winter process described in Ser. No. 549,319, now U.S. Pat. No. 3,470,607. Briefly, this process comprises providing the core in a thickness less than ½", providing the cladding in plate form in the thickness less than ¼", rolling together said core and cladding to form a green bond, cold rolling the resulting poorly bonded composite at least 50%. In the case of iron core composites, the green bond is formed with a rolling reduction of from 40% to 65%, with a subsequent cold rolling reduction requiring at least an additional 10% to give a total reduction of at least 60%. However, if desired, the bond can be formed by heating the core as described in Ser. No. 638,668, now abandoned and Ser. No. 465,156, now U.S. Pat. No. 3,381,365 to a temperature of at least 300° F. Still another process described in the Ser. No. 538,697, now abandoned which could be used in which the rolling operation causes one component only to recrystallize. However, the previously described Radar, Goldman, Winter process is preferred.

After the bond is formed, the composite is cold rolled to final gauge.

When the composite is made of the previously mentioned .02% to 2% zinc, and 0.001% to 0.2% boron, 0.05% to 0.4% iron, aluminum alloy, only annealing at 1000 to 1100° F. for 1 to 60 minutes is required prior to use. This treatment insures softening of the iron core, as well as the aluminum cladding.

In the case of aluminum components containing less than 0.5% silicon, including the previously mentioned Al-Zn-B-Fe aluminum component, it is preferred to provide an aluminum alloy layer having a thickness of 5 to 10% of the aluminum component which alloy layer contains at least 0.5% silicon to prevent bond degradation of the aluminum component steel bond during annealing.

This layer is metallurgically bonded to the aluminum component by any of the previously mentioned bonding processes before the aluminum component is bonded to the steel component. Then, in bonding the aluminum component to the steel, the face of the aluminum component containing the additional layer is bonded to the steel by the previously described bonding process. By so doing, any tendency for bond deterioration during annealing is avoided.

After the annealing treatment, the composite is ready for the formation of the cable bundle shown in FIG. 1 according to conventional techniques well known to those skilled in the art.

However, the zinc, boron, magnesium, silicon alloy requires heat treatment for optimum strength, ductility, and electrical conductivity. After the composite is cold rolled to final gauge, it should be heated at a temperature of 1,000 to 1,150° F. for a period of time from 1 to 60 minutes depending on the thickness. The composite should then be cooled to room temperature at a rate of least 400° F. per minute, room temperature being a temperature of less than 300° F. The composite should then be heated at a temperature of from 250° F. to 400° F. for a period of from 15 minutes to 24 hours. This treatment increases the strength and conductivity of the aluminum component. The preferred range for this latter treatment is 300° F. to 325° F. for a period of time of 2 to 8 hours. This treatment results in a yield strength of at least 35,000 p.s.i. and a conductivity of at least 52% to IACS. The composite is then ready for forming the bundle shown in FIG. 1.

The following examples illustrate the invention without limiting its scope.

EXAMPLE 1

Alloys having the following chemical composition were made in the form of .060 thick sheet.

Alloy No. 1

| | |
|---|---|
| Silicon | .06 |
| Iron | .14 |
| Boron | .011 |
| Zinc | .97 |
| Copper | .003 |

Alloy No. 2

| | |
|---|---|
| Silicon | .63 |
| Iron | .20 |
| Boron | .025 |
| Magnesium | .56 |
| Zinc | .97 |
| Copper | .033 |

Alloy No. 3

| | |
|---|---|
| Silicon | .37 |
| Iron | .05 |
| Boron | .001 |
| Magnesium | .62 |
| Tin | .09 |
| Copper | .001 |

Alloy No. 4

Fisher "pure" zinc

| | |
|---|---|
| Zinc | 99.99%+ |

Alloys 1–3 were cast as chill castings and scalped to a thickness of 1.5". Alloys 1 and 2 were homogenized at a 1000° F. for 12 hours whereas Alloy 3 was homogenized at the same temperature for 1 hour. Alloys 1–3 were hot rolled with a seven pass schedule at a starting temperature of 850° F. to final hot rolled thickness of 0.2". They were then cold rolled in six passes to a final thickness of 0.070" without an intermediate anneal.

Alloys 1–3 were then heated at 1000° F. for 1 hour. Alloy 1 was cooled in still air to room temperature whereas Alloys 2 and 3 were quenched in still water to room temperature. Alloy 2 was then aged at 330° F. for 8 hours and Alloy 3 was aged at 350° F. for 5 hours.

EXAMPLE 2

After preparation as described in Example 1, Alloys 1–3 were tested and found to have the following physical properties.

| Alloy No. | T.S., K s.i. | Y.S., K s.i. | Percent elongation | Electrical conductivity, percent IACS |
|---|---|---|---|---|
| 1 | 9.8 | 4.8 | 32 | 59 |
| 2 | 38.4 | 35.2 | 10.0 | 52 |
| 3 | 28.6 | 25.1 | 11.0 | 53 |

EXAMPLE 3

Alloys 1–4 were coupled to equal areas of commercial 1010 mild steel in the following galvanic cell set-up.

Figure 3:
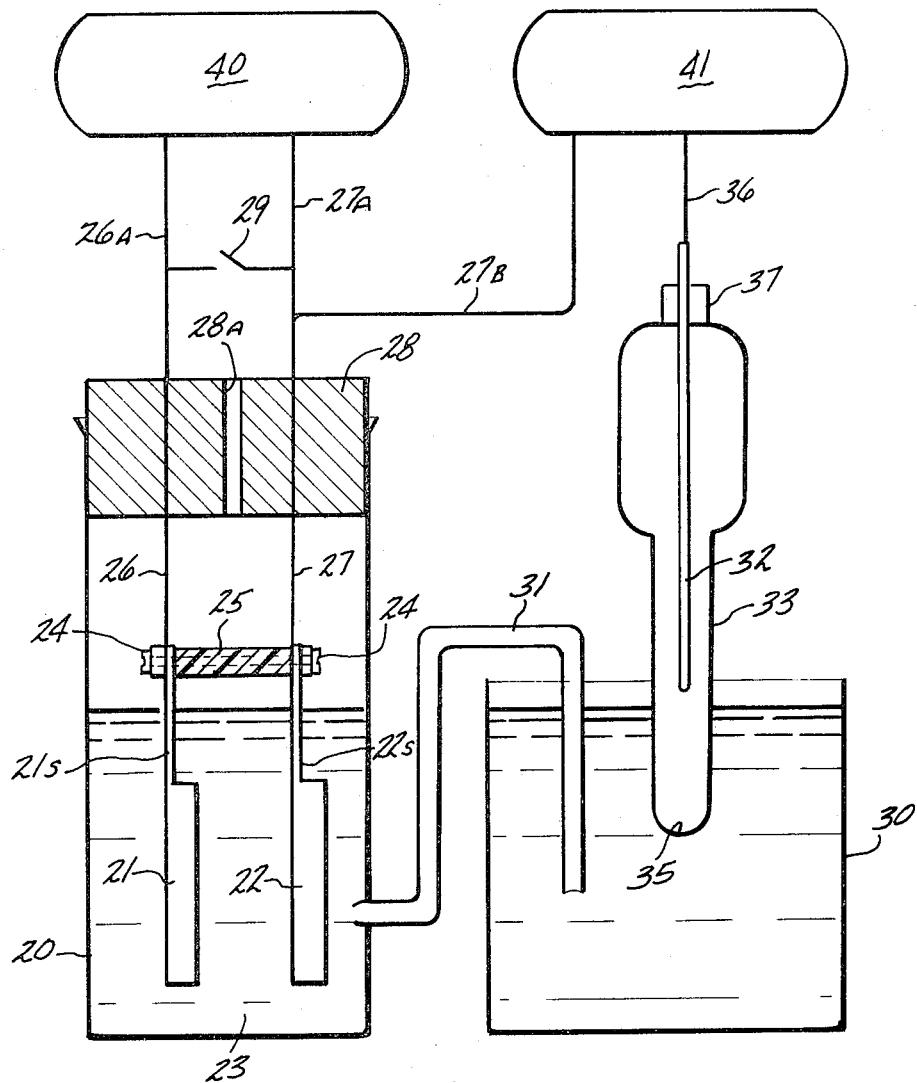
FIG. 3 is a schematic view of the apparatus used in Example 3.

The apparatus as shown in FIG. 3, comprised two silica cells 20 and 30. A .1 molar NaCl electrolyte was used as shown at 23. Within the cell were placed the aluminum alloy specimens 21 and the mild steel specimens 22. The specimens were 5 cm. by 1 cm. with narrow strip 21S and 22S which extended up to holder 25. The strips were mounted by means of nylon screws 24 in a Micarta holder 25. Platinum leads 26 and 27 passed through a rubber stopper 28 open to the atmosphere at 28A and were connected to a Sargent Model MR recorder by way of leads 26A and 27A. The recorder, which contained a 1000-ohm input resistance was in parallel with a zero resistance shunt equipped with an open-and-shut switch 29.

The second silica cell 30 was connected to the first silica cell 20 by means of a salt bridge 31 of conventional construction. The .1 molar NaCl solution was, of course, maintained in the cell 30. A standard calomel electrode 32 was immersed in saturated potassium chloride solution 34 which was isolated from the NaCl in cell 30 by a glass housing 33. In the lower portion of the glass housing 33 a porous plug 35 provided electrical communication with the NaCl electrolyte but prevented mixing of the KCl and NaCl. A lead 36 passing through a glass-to-metal seal 37 was provided and this lead was connected to a Leeds and Northrup Speedomax, a one megohm recorder 41. Also connected to the Speedomax recorder was lead 27B from the mild steel specimen. This enabled measurement of the corrosion potential of the steel when switch 29 was in the closed position, referenced to the calomel standard electrode 32.

The Sargent recorder measures the current passing through the cell and the 1000-ohm input resistance of the instrument with the switch 29 open.

By knowing the area of the specimens, the total coulombs supplied to the mild steel can be calculated. The efficiency of the aluminum alloys is calculated from the total coulombs provided by the aluminum specimen in the cell, divided by the coulomb equivalent of the weight loss experienced by the aluminum specimen during the test.

Galvanic tests were conducted for a period of 188 hours to determine the degree of cathodic protection afforded by Alloys 1–4 to the mild steel cathodes. These tests also permitted determination of anodic efficiency, which in turn, is related to the rate of destruction of a sacrificial coating.

The results obtained on the Alloys 1–4 are shown below in tabular form.

| Alloy No. | Total coulombs supplied sq./mc. to mild steel in 168 hours | Anodic efficiency, percent | Degree of protection of mild steel | Average value of corrosion potential |
|---|---|---|---|---|
| 1 | 15.09 | 100 | Complete | −.85 |
| 2 | 10.14 | 49 | do | −.80 |
| 3 | 9.72 | 55 | Incomplete weight loss on steel reduced only by 60%. | −.77 |
| 4 | 27.8 | 4 | Complete | −1.00 |

EXAMPLE 4

Metallurgically bonded composites of Alloys 1 and 2 were made with 1010 clad mild steel as a core. The composites comprised 0.007″ of the aluminum alloy clad on one side of 0.003″ of 1010 mild steel. A thin layer of the same aluminum alloy 0.001″ thick was clad on the reverse side of the mild steel.

The cold process described in previously mentioned S.N. 465,156, now U.S. Pat. No. 3,381,365 by J. Winter, A. Goldman, and W. Radar was utilized. Bonding was achieved with a 70% cold reduction in the bonding step, thereafter the composite was cold rolled 30% to the final gage of 0.011″.

The composites were then subjected to the specific thermal cycles outlined for the individual alloys in Example 1, thereby insuring softening of the mild steel core plus proper treatment of the aluminum alloy cladding.

A control sample comprising copper Alloy 110 clad on 1010 mild steel with a backing of 1100 Aluminum Association Designation was utilized as one control. This is a commercial composite presently being utilized for cable sheathing. The dimensions of the individual layers were as follows:

Alloy 110 _____ .002″
101° mild steel _____ .003″
1100 Aluminum _____ .005″

A second control sample of copper Alloy 110 clad on 1010 mild steel with a backing of copper Alloy 110 was also employed. The composite was 0.006″ thick with its three layers each of equal thickness.

The four samples of composite measuring 5 x 8 cms. were mechanically scribed with a Dremel tool so as to expose the mild steel core member. In the case of the copper composites, scribing was conducted through the copper surface since this is exposed to soil corrosion. Scribing of the aluminum composites with Alloys 1 and 2 was accomplished through the thicker aluminum layers.

The samples were immersed, with the shorter dimension vertical, two inches below the surface of a Charlton fine sandy loam at maximum separation from each other and with 120 cubic inches of soil to each sample in plastic boxes. The initial pH of the soil was 4.22 and its moisture context was 29%. The soil boxes were stacked in a salt spray box maintained at 100° F. containing an open reservoir of 0.5% potassium nitrate solution to maintain the moisture content constant throughout the exposure.

After one months exposure, the samples were removed from isolation and cleaned prior to examination. The steel clad with aluminum Alloys 1 and 2 was cleaned by immersion for 5 minutes at 180° F. in 20 parts of chromic trioxide, 15 parts of orthophosphoric acid and 65 parts of distilled water. After cleaning, the samples were rinsed and dried. The copper clad control samples were cleaned in 20% sulfuric acid at 110° F. for five seconds, followed by rinsing and drying.

The composite of steel clad with aluminum Alloy No. 1 showed no instances of perforation of the steel exposed in the scribe lines. The exposed steel was mainly grey in color, apart from a few localized brown rust spots indicating that the aluminum Alloy No. 1 cladding had afforded sacrificial protection to the steel in the moist acid soil. The aluminum cladding No. 1 was pitted in spots away from the scribe lines, but the corrosion was normal to aluminum alloys in such aggressive soils.

The composite of steel clad with aluminum Alloy No. 2 also showed no instances of perforation where the steel had been exposed to the soil at the scribe lines. Furtermore, the occasional rust spots on the exposed steel, noted in the case of the composite of steel with aluminum Alloy No. 1 were largely absent. In addition to this, the aluminum Alloy No. 2 surface exposed to the soil showed general staining but no significant pitting away from the scribe lines.

In contrast, the composite steel controls clad with the copper Alloy 110 showed catastrophic corrosion at the scribe lines. The great bulk of the steel at the exposed scribe lines in the 110–1010–110 control had completely disappeared by galvanic corrosion with the copper cladding on the reverse side being exposed. Complete perforation of the steel was also observed in the 110–1010–1100 commercial control; the total amount of steel destroyed at the scribe line was less than that in the 110–1010–110 control. This was due to a sacrificial action of the underlying 1100 aluminum alloy which was exposed at many locations in the scribe lines.

It is to be understood that the invention is not limited to the illustrations described and shown herein which are deemed to be merely illustrative of the best modes of carrying out the invention, and which are susceptible of modifications of form, size, arrangement of parts and detail of operation but rather is intended to encompass all such modifications which are within the spirit and scope of the invention as set forth in the appended claims.

We claim:

1. An aluminum alloy galvanically protective to steel consisting essentially of from 0.2% to 2.0% zinc, 0.001% to 0.2% boron, and from 0.05 to 0.4% iron, said alloy having an electrical conductivity of at least 50% IACS.

2. An aluminum alloy galvanically protective to steel consisting essentially of 0.2% to 2.0% zinc, 0.001% to 0.2% boron and 0.05% to 0.4% iron, up to 0.2% silicon, balance essentially aluminum, said alloy having a conductivity of at least 50% IACS.

3. An aluminum alloy according to claim 1 containing 0.4% to 1.2% silicon, and 0.3% to 1.4% magnesium.

4. An aluminum alloy galvanically protective to steel consisting essentially of 0.2% to 2.0% zinc, 0.001% to 0.2% boron, 0.4% to 1.2% silicon, 0.3% to 1.4% magnesium, up to 0.5% iron, up to 0.4% copper, up to 0.2% manganese, up to 0.1% chromium, other impurities 0.05% maximum each, total 0.15% maximum, balance aluminum.

5. An alloy according to claim 4 in which zinc content is from 0.5% to 1.5%.

6. An alloy according to claim 5 in which the silicon content is from 0.3% to 0.9%.

7. An alloy according to claim 6 in which magnesium content is from 0.6% to 0.9%.

8. An alloy according to claim 7 in which boron content is from 0.004% to 0.1%.

References Cited

UNITED STATES PATENTS

| | | | |
|---|---|---|---|
| 2,782,493 | 2/1957 | Russell | 29—196.2 |
| 1,903,843 | 4/1933 | Titus | 75—146 |
| 1,916,087 | 6/1933 | Titus | 75—148 |

RICHARD O. DEAN, Primary Examiner

U.S. Cl. X.R.

75—141; 148—32.5

UNITED STATES PATENT OFFICE
CERTIFICATE OF CORRECTION

Patent No. 3,676,113              Dated July 11, 1972

Inventor(s) Michael J. Pryor and William H. Anthony

It is certified that error appears in the above-identified patent and that said Letters Patent are hereby corrected as shown below:

Column 2, line 31, delete "aluminous" and insert -- aluminum --

Column 5, line 36, delete "188" and insert -- 168 --

Column 5, line 46, delete "mc." and insert -- cm. --

Column 6, line 48, delete "Furter-" and insert -- Further- --

Column 8, line 4, delete "0.3" and insert -- 0.5 --

Signed and sealed this 6th day of March 1973.

(SEAL)
Attest:

EDWARD M. FLETCHER, JR.
Attesting Officer

ROBERT GOTTSCHALK
Commissioner of Patents